United States Patent [19]
Fort et al.

[11] Patent Number: 5,156,374
[45] Date of Patent: Oct. 20, 1992

[54] VALVE ASSEMBLY

[75] Inventors: Edward S. Fort, Chatburn; Stephen H. Davenport, Laneshawbridge, both of England

[73] Assignee: Fort Vale Engineering Limited, England

[21] Appl. No.: 619,455

[22] Filed: Nov. 29, 1990

[30] Foreign Application Priority Data

Nov. 30, 1989 [GB] United Kingdom ............... 8927059

[51] Int. Cl.$^5$ ............................................. F16K 1/20
[52] U.S. Cl. .................................. 251/303; 251/144; 251/297
[58] Field of Search ................. 251/297, 298, 303, 144

[56] References Cited

U.S. PATENT DOCUMENTS

| | | | |
|---|---|---|---|
| 3,268,202 | 8/1966 | Murray et al. | 251/303 |
| 4,698,940 | 10/1987 | Zwicker | 251/303 X |
| 4,913,398 | 4/1990 | Ziaylek, Jr. et al. | 251/298 X |

FOREIGN PATENT DOCUMENTS

| | | | |
|---|---|---|---|
| 2212972 | 9/1973 | Fed. Rep. of Germany | 251/298 |
| 1305084 | 8/1962 | France | 251/298 |
| 883540 | 11/1961 | United Kingdom . | |
| 1337405 | 11/1973 | United Kingdom . | |
| 2103775 | 2/1983 | United Kingdom . | |

Primary Examiner—John Rivell
Attorney, Agent, or Firm—John S. Hale

[57] ABSTRACT

A valve is in the form of a valve body having a valve inlet, a valve outlet and a valve seat disposed between the inlet and the outlet. A valve closure member is movable between a first, closed position in abutment with the valve seat and a second, open position in which it is displaced from the valve seat.

A shaft is pivotally mounted within the valve body and one end is connected to an actuating handle, by means of which it is pivotable. An arm is connected to the shaft and to the valve closure member, whereby movement of the actuating handle causes opening and closing of the valve.

The positioning of the pivoting portions of the valve and the spring within the valve body (i.e. in an aperture actually within the material forming the valve body) means that the only item other than the valve closure member in the path of the material being discharged is the arm, and that when in the open position the valve closure member causes no constriction of the bore.

15 Claims, 3 Drawing Sheets

VALVE ASSEMBLY

BACKGROUND OF THE INVENTION

The present invention relates to valves, and in particular, but not exclusively, to valves for controlling the discharge of liquids and gases.

When it is desired to discharge a fluid from a storage tank, the flow of fluid is regulated by means of a valve connected to an outlet of the tank. Known valves comprise a valve closure member which is engageable with, and displaceable away from a valve seat to control the fluid flow.

Conventionally, the valve closure members of such valves are biassed into engagement with the valve seat by a spring, and are displaceable away from the valve seat against the force of the spring by movement of an actuating handle. In some valves, the handle is used to actuate a cranking mechanism located on the discharge side of the valve and in which the displacement of the handle causes a finger member of the cranking mechanism located in a recess of the valve closure member to lift the valve closure member off the valve seat, and thereby allow the flow of fluid through the valve.

The problem with the known discharge valves is that the springs and/or actuating mechanisms are located in the flowpath of the fluid into or out of the valve. This can cause problems where chemically aggressive fluids are being discharged, which might necessitate manufacture of components from more expensive, chemically inert materials. It can also cause problems where pasty or sludgy products are being discharged, since the products might clog up the actuating mechanism or spring, thereby making it difficult or impossible to open or close the valve. Also, some actuating mechanisms require the valve to be located relatively high up in a frame in which a container is mounted, thereby reducing the size (and capacity) of the container which can be mounted in the frame, since the valve must be positioned at the lowest point of the container.

It is an object of the present invention to provide a valve which aims to overcome the above disadvantages.

SUMMARY OF THE INVENTION

In accordance with the present invention, there is provided a valve assembly comprising a valve body having a valve inlet, a valve outlet, a valve closure member movable between a first, closed position in which it sealingly abuts a valve seat and a second, open position in which it is displaced from the valve seat, and a flow passage extending between the valve inlet and the valve outlet for the passage of material through the valve when the valve closure member is displaced from its valve seat, characterised by a shaft pivotally mounted externally of the flow passage, actuating means located externally of the valve body and connected to the shaft for pivoting the latter, and an arm connected to the shaft, extending through an aperture in the wall of the flow passage and connected to the valve closure member only on its downstream side, and in that the valve closure member is displaceable from the valve seat in the upstream direction of the valve.

Such a valve may be easily opened and closed, and the positioning of the pivoting portions of the valve externally of the flow passage, (e.g. in an aperture or bore actually within the material forming the valve body) means that the only item, other than the valve closure member, in the path of the material being discharged is the arm. This feature, together with the reduced turbulence it produces, results in an increased discharge rate of material from the valve. Such a valve may be investment cast, resulting in a valve which is lighter in weight than known valves. Also, the pivotally mounted shaft is preferably physically isolated by sealing means from the material to be discharged, which is particularly useful if pasty or sludgy materials are being discharged, since these will be unlikely to hinder the pivoting of the shaft.

Preferably, the shaft is spring biassed (e.g. by means of a torsion spring) to urge the valve closure member towards the closed position. Preferably, the spring is also located within the valve body, and preferably comprises a torsion spring located around the shaft. Preferably, the spring is physically isolated from the material being discharged by a sealing means. The isolation of the spring from the material prevents fouling of the spring by pasty or sludgy material, and also allows less expensive materials to be used in the valve construction where chemically aggressive materials are being discharged.

There may be means for retaining the valve closure member in the open position. This may comprise a detent mechanism associated with the actuating member. The actuating member may be in the form of a handle connected to the shaft.

Preferably, a valve chamber is defined between the valve inlet and the valve outlet, and preferably the arm extends through an aperture in the wall of the valve chamber.

The valve closure member may be generally circular in shape and may be adapted to an annular valve seat in the closed position. In one embodiment the valve inlet is circular and the valve outlet is elliptical.

Preferably, the valve closure member is releasably securable to the arm.

The valve seat may be located between the valve inlet and the valve outlet.

BRIEF DESCRIPTION OF THE DRAWINGS

By way of example only, a specific embodiment of the present invention will now be described, with reference to the accompanying drawings, in which.

DESCRIPTION OF THE PREFERRED EMBODIMENT

Figure 1:
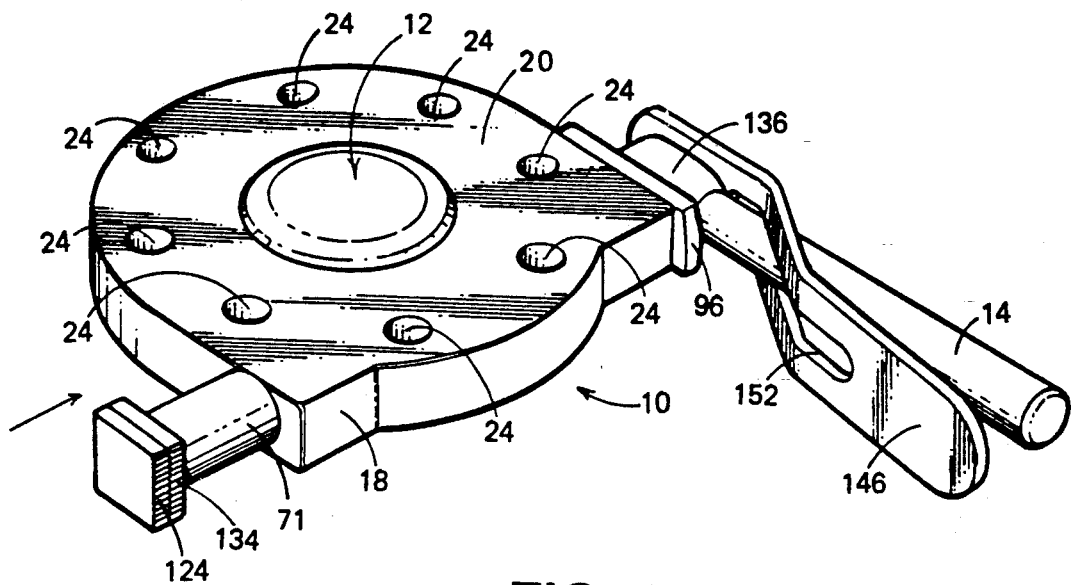
FIG. 1 is a perspective view of an embodiment of valve in accordance with the present invention.

The valve comprises a valve body 10 and a valve closure member 12 movable relative to the valve body by means of an actuating lever 14. The valve closure member 12 is pivotable from a closed position (shown in FIGS. 1, 3, 4 and 5) in which it abuts an annular valve seat 16 in the valve body to an open position in which it is spaced apart from the valve seat.

The valve body 10 comprises a stainless steel metal plate 18 having inner and outer flat, parallel faces 20,22. The valve is securable to the outlet of a container, such as a storage tanker, with the inner face 20 in contact with the container, by means of bolts passing through eight equally angularly spaced bolt apertues 24 extending through the plate 18 perpendicularly to the planes of the faces 20,22.

Figure 2:
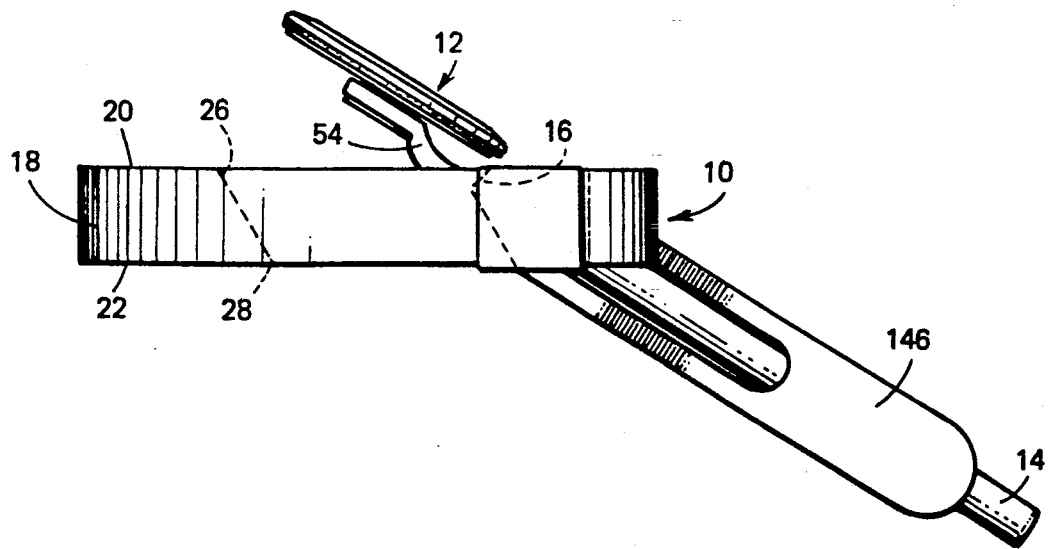
FIG. 2 is an inverted plan view of the valve of FIG. 1.

The valve body is provided with a circular inlet 26 in its inner face 20 and an elliptical outlet 28 in its outer face 22, with a valve flow passage 30 extending between the inlet and the outlet. The valve seat is concial and is provided by means of an outwardly flaring annular portion 32 adjacent to the inlet 26, as best seen in FIGS. 2 and 3, and the elliptical outlet 28 is suitable for direct connection with an outlet pipe extending at an angle of 30° to the normal to the planes of faces 20,22 of the valve body, although the shape of the outlet could be altered to suit different pipes.

The valve closure member comprises a main valve closure body 34, an O-ring seal 36 (e.g. a PTFE seal) and a seal retaining member 38. The main valve closure body is generally disc-like in construction with a protruding central boss 40 and its maximum diameter is greater than that of the annular valve seat 16. The main valve closure body is provided with an annular groove 42 near its periphery, which is shaped to receive a portion of the O-ring seal 36. The seal 36 is held in place by means of the seal retaining member 38 which is annular in shape and which is releasably securable to the main valve closure member 34 by means of three equally angularly spaced securing bolts 44 which pass through bores 46 in the seal retaining member 38 into aligned threaded recesses 48 in the main valve closure body. The O-ring seal projects partially beyond the main valve closure body 34 and the seal retaining member 38 and may be replaced when necessary by removing the seal retaining member 38.

Figure 5:
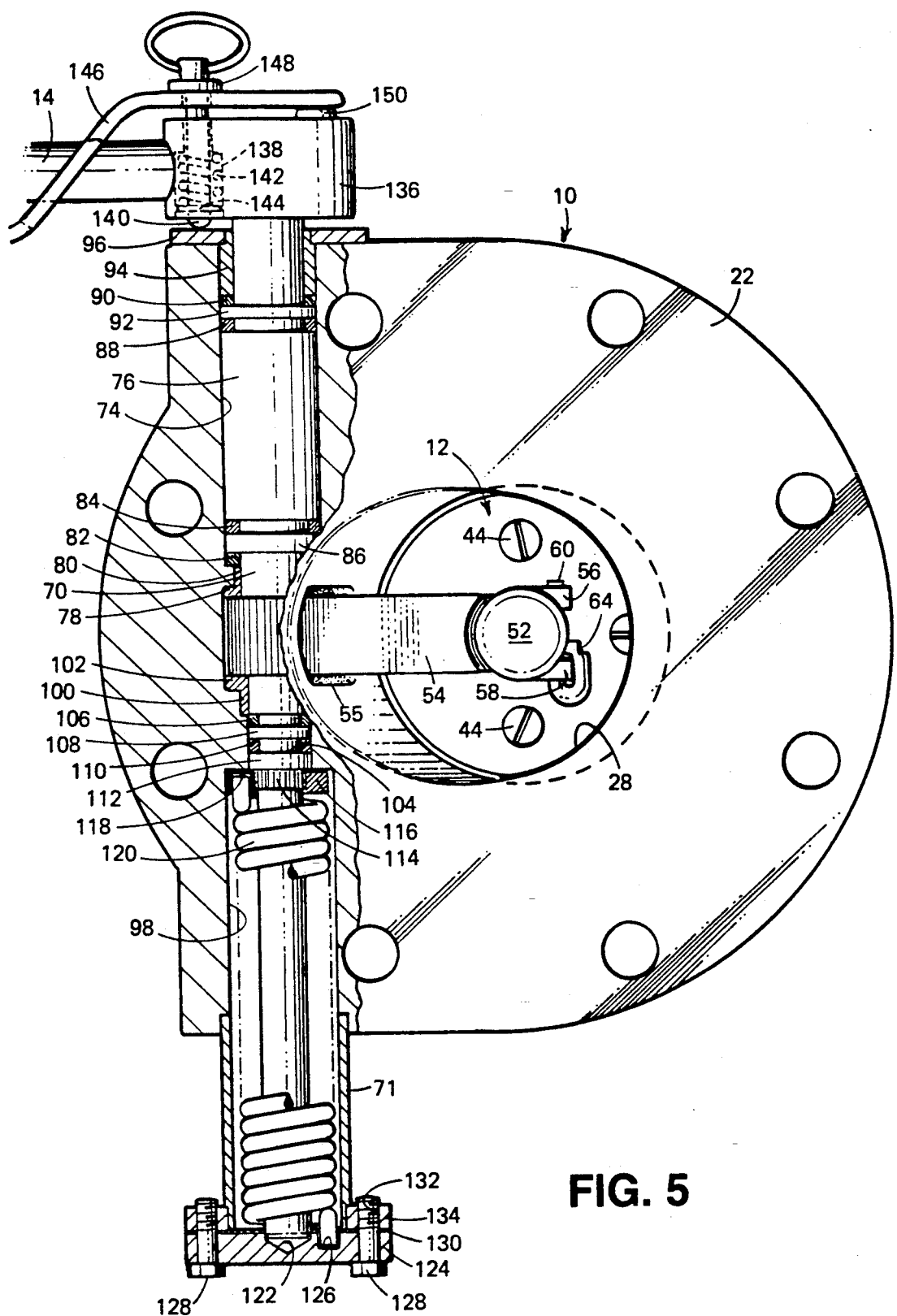
FIG. 5 is a rear view, partly in cross-section, of the valve of FIG. 1.

The central boss 40 of the valve closure body is provided with a further boss 50 of reduced diameter which is in turn provided with an enlarged head 52 by means of which the valve closure member 12 is securable to a pivotally mounted crank arm 54, as will be explained. As best seen in FIGS. 3 and 5, one end of the crank arm 56 is provided with two forked portions 56, 58 which are adapted to straddle the reduced diameter boss 50 on the valve closure body 34. The valve closure body is securely attached to the crank arm 54 by means of a pin 60 which passes through aligned apertures 62 in the two forked portions 56, 58 and which is held in place by deforming a portion 64 of the pin around one of the forked portions 58. It should be noted that the underside of the enlarged head 52 on the boss 50 and the portion of the forked portions 56, 58 in contact therewith are both part-spherical, to permit some small degree of movement. The pin 60 may be withdrawn when the valve is in the open position to allow the valve body 34 to be removed in order to enable the seal retaining member to be removed if it is desired to replace the seal.

Figure 3:
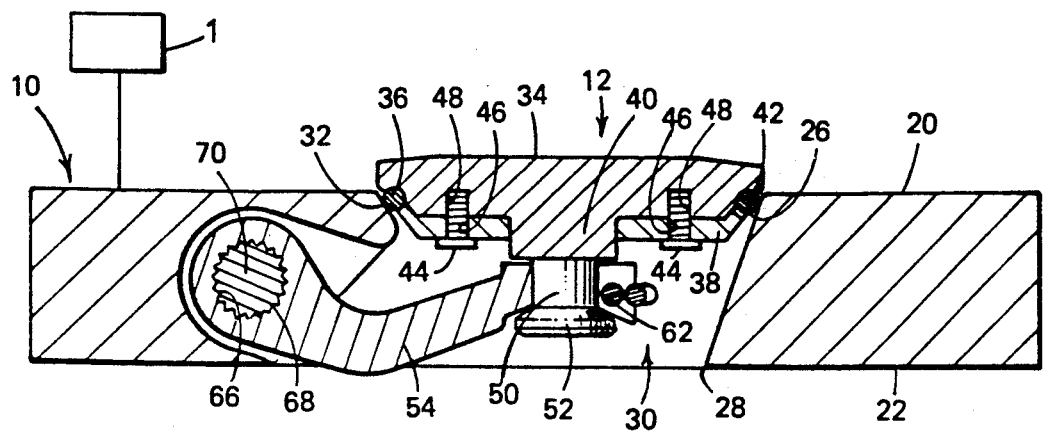
FIG. 3 is a cross-sectional plan view of the valve of FIG. 1.
Figure 4:
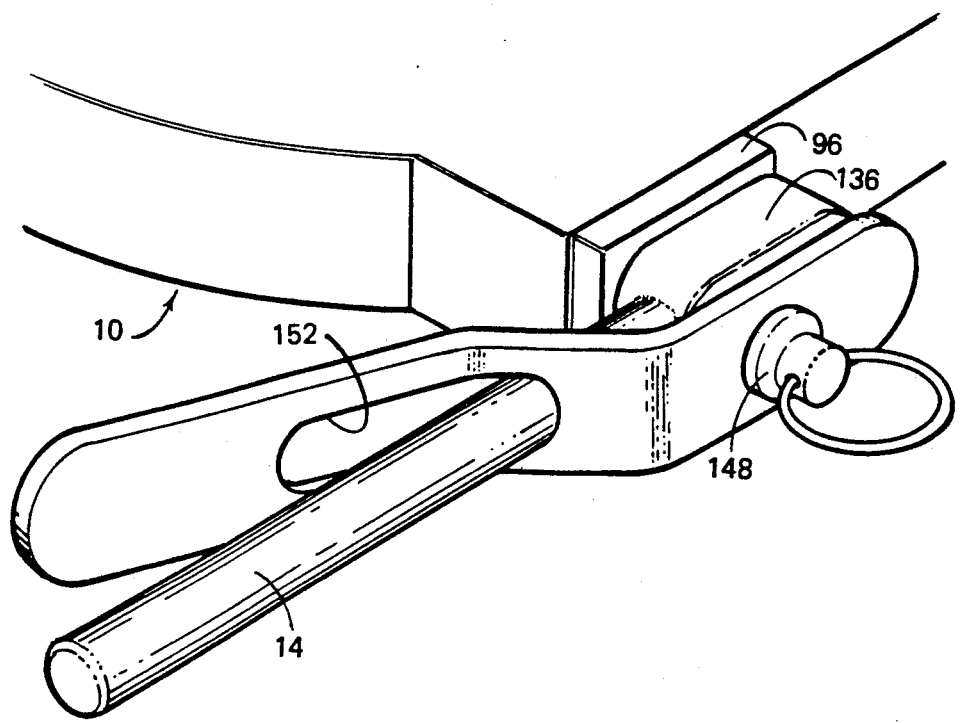
FIG. 4 is a perspective view of the actuating lever of the valve of FIG. 1.

As best seen in FIGS. 3 and 5, the crank arm 54 passes through a rectangular aperture 55 in the wall of the valve passage 30. The arm is provided with an internally splined portion 66 which is located over a complementarily splined portion 68 of a rod 70 which extends perpendicularly to the crank arm 54. One end of the rod is connected to the actuating lever 14, whereas the other end of the rod extends into a tubular spring housing 71 projecting outwardly from the main portion of the valve body.

The portion of the rod 70 extending towards the actuating lever passes through a bore 74 provided in the valve body, and the rod 70 is provided with a portion 76 of enlarged diameter which is of substantially the same diameter as the bore 74 and which retains the rod 70 in alignment with the bore 74. A glass-filled PTFE bushing 78 located around the rod abuts the upper surface of the splined portion of the crank arm 54 and a reduced diameter neck portion 80 of the bore. A PTFE ring 82 located around the rod engages the bore 72 and is separated from a PTFE O-ring 84 around the rod and in contact with one end of the enlarged diameter portion 76 of the rod by means of a washer 86. A Viton seal 88 located around the rod 70 is in contact with the opposite end of the enlarged rod portion 76 and is separated from a further PTFE O-ring 90 located around the rod by means of a further washer 92. The O-ring 90 is held in place by means of a stuffing arrangement 94 which in turn is held in position by a metal collar 96 releasably securable to the valve body by bolts (not visible) passing through bores in the collar into aligned screwthreaded bores in the valve body.

The opposite end of the rod passes through a further bore 98 in the valve body and is aligned with the tubular spring housing 72. The bore 98 is provided with a first reduced diameter portion 100 which accommodates a glass-filled PTFE bushing 102, and a portion 104 of smaller diameter which accommodates a sealing arrangement in the form of a PTFE O-ring 106, a washer 108, a Viton seal 110 and a further washer 112. The sealing arrangement and the glass-filled PTFE bushing 102 isolate the main portion of the bore 98 and the tubular spring housing 72 from the valve passage 30.

At the end of the main portion of the bore 92 nearest the crank arm 54, the rod is provided with a splined portion 114 which receives a complementarily internally splined washer 116. The washer is provided with a recess 118 which receives an end of a stainless steel torsion spring 120 located around the rod. The end of the spring 120 may be welded to the washer 116 to aid assembly of the valve. The end of the rod 70 remote from the crank arm 54 is received in a recess 122 in a plate 124 secured to the free end of the tubular spring housing 72, and the other end of the spring 120 is received in a further recess 126 in the plate 124. The plate 124 is secured in position by means of two bolts 128 which pass through the plate 124, through a gasket 120 and into aligned tapped bores 132 provided in a flange 134 located around the periphery of the free end of the tubular spring housing 72.

Referring to FIGS. 1, 2, 4 and 5, the actuating lever 14 is welded to a boss 136 which is connected to the rod 70. The boss 136 is provided with a detent mechanism in the form of a stepped bore 138 which receives a retaining pin 140 which is biassed into engagement with the metal collar 96 by means of a compression spring 142 extending between the shoulder between the narrower and wider portions of the stepped bore 138 and a flange 144 secured to the pin. The pin may be moved in a direction out of engagement with the collar 96, against the force of the spring 142, by means of a release lever 146 which abuts a head 148 secured to the pin, and which is adapted to pivot against a lug 150 on the collar 96. The release lever is cranked and is thus provided with a slot 152 through which the actuating lever passes. This allows the retaining pin 140 to be withdrawn by squeezing the release lever 146 towards the actuating lever 14.

In use, the valve is assembled as illustrated and is connected to an outlet to be controlled, by means of the eight holes 24, as previously explained. In order to preload the torsion spring 120, it is necessary to engage the ends of the spring in the respective recesses 118, 126 in the washer 116 and plate 124 respectively. The end plate is then rotated, e.g. with a torque wrench, until the desired spring preload is obtained, whereupon the bolts 128 can be inserted and secured. This operation is aided by engagement of one end of the rod 70 in the recess 122 in the plate. The preload is usually adjusted to a value of about 70 lbs (approx 310N). Since the force exerted by the spring acts on the washer 116 which transmits the force to the rod 70 via the splined portion 114 on the rod 70, the valve closure member is biassed towards the closed position by virtue of the engagement of the arm 54 with the splined portion 68 of the rod 70. In order to open the valve, the actuating lever is moved to the position shown in FIG. 2, against the force of the spring 120, by manual pressure, which causes the valve closure member to move out of engagement with the valve seat, in the upstream direction of the valve, i.e. against the direction of fluid flow and away from the valve outlet 28, thus allowing material to flow through the valve. As the actuating lever is moved to the position of FIG. 2, the retaining pin moves past the edge of the collar 96, and the force exerted by the compression spring forces the pin down below the level of the collar 96. Thus, when the actuating lever is released, the valve will still be held open by the engagement of the retaining pin with the collar 96. In order to release the pin and allow the valve to close, the release lever 146 is squeezed towards the actuating lever, which withdraws the retaining pin to a position above the level of the collar 96 and enables the force of the main torsion spring 120 to move the valve closure member to close the valve. The preload on the spring results in the valve snapping shut.

It should be noted that the only item which might restrict the flow of material through the valve, other than the valve closure member, is the crank arm 54. In particular, the spring is isolated from the interior of the valve and thus will not become contaminated during normal use. Also, the relatively few components in the flow path results in an increased rate of discharge, and this is enhanced by the reduced turbulence resulting from the small number of components in the flow path. The valve is also easy to clean, since only a few components are exposed to the material flowing through it. The opening of the valve closure member in the upstream direction of the valve also helps to dislodge any material which may have set or partially set in the vicinity of the valve. A valve which opens in the downstream direction cannot dislodge any material, and relies on gravity and fluid pressure to dislodge any set material. Also, the valve is easier to service since, for example, the seal 36 on the valve closure member may be replaced without the need to remove the whole valve. Moreover, since the actuating mechanism is not located in the path of material flowing through the valve, the valve can be mounted lower in a tank support frame (by approximately 1/16 inch or 1.6 mm) which increases the size of the tank to which the valve may be attached for a given tank support frame.

The invention is not restricted to the details of the foregoing embodiment. For example, although the valve as shown as being movable to a single fixed open position, it is possible that the valve may be opened to different degrees, thus acting as a flow control valve. Also, the valve need not be opened by the actuating lever 14, but instead the shaft 70 may be rotatable by other actuating means, such as a cable operated or hydraulically operated mechanism.

I claim:
1. A valve assembly comprising:
   a valve body;
   a valve inlet in said valve body;
   a valve outlet in said valve body;
   a flow passage extending between said inlet and said outlet;
   a shaft pivotally mounted externally of said flow passage;
   actuating means located externally of said valve body and connected to said shaft for pivoting the latter;
   an arm, a first end of which is connected to said shaft;
   an aperture in a wall of said flow passage, through which aperture said arm extends from said shaft;
   a valve seat;
   a valve closure member connected only on its downstream side to a second end of said arm, and moveable in an upstream direction of said valve, by pivoting of said shaft by said actuating means, between a first, closed position in which it sealingly abuts said valve seat and thereby prevents the flow of material through said flow passage, and a second, open position in which it is displaced from said valve seat and thereby permits the flow of material through said flow passage;
   said valve assembly comprising a spring acting upon said shaft to urge said valve closure member towards said closed position, wherein said spring is located within said valve body and comprises sealing means for isolating said spring from the material being discharged through said valve.
2. A valve assembly as claimed in claim 1, further comprising a bore in the material forming said valve body, within which said shaft is pivotally located.
3. A valve assembly as claimed in claim 1, wherein said spring comprises a torsion spring.
4. A valve assembly as claimed in claim 1, wherein said torsion spring is located around said shaft.
5. A valve assembly as claimed in claim 1, further comprising means for retaining said valve closure member in said open position.
6. A valve assembly as claimed in claim 5, wherein said means for retaining said valve closure member in said open position comprise a detent mechanism associated with said actuating member.
7. A valve assembly as claimed in claim 1, wherein said actuating means comprises a handle connected to said shaft.
8. A valve assembly as claimed in claim 1, wherein said actuating means is operable remotely.
9. A valve assembly as claimed in claim 1, wherein said valve closure member is generally circular in shape.
10. A valve assembly as claimed in claim 1, wherein said valve inlet is circular.
11. A valve assembly as claimed in claim 1, wherein said valve outlet is elliptical.
12. A valve assembly as claimed in claim 1, wherein said valve closure member is releasably securable to said arm.
13. A valve assembly as claimed in claim 1, wherein said valve body is provided with a planar face for abutment with a fluid container.
14. A valve assembly as claimed in claim 13, comprising two parallel planar faces.
15. A valve assembly as claimed in claim 1, wherein said valve seat is located between said valve inlet and said valve outlet.

* * * * *